US008388148B2

(12) United States Patent
Jeon et al.

(10) Patent No.: US 8,388,148 B2
(45) Date of Patent: Mar. 5, 2013

(54) OPTICAL SYSTEM INCLUDING A BLOCKING UNIT

(75) Inventors: Kee-uk Jeon, Seoul (KR); Sang-ik Kim, Suwon-si (KR); Kyoung-choul Jang, Suwon-si (KR); Boing-jo Kang, Suwon-si (KR); Wook-jae Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 12/772,421

(22) Filed: May 3, 2010

(65) Prior Publication Data

US 2011/0001939 A1 Jan. 6, 2011

(30) Foreign Application Priority Data

Jul. 2, 2009 (KR) .................. 10-2009-0060180

(51) Int. Cl.
*G03B 21/28* (2006.01)

(52) U.S. Cl. ............... 353/98; 353/20; 353/28; 353/31; 353/79; 353/88; 353/78; 353/97

(58) Field of Classification Search ............ 353/78, 353/20, 99, 28, 77, 31, 98, 79, 88, 97; 359/478–479, 359/631, 633; 349/5, 7, 8, 9
See application file for complete search history.

(56) References Cited

U.S. PATENT DOCUMENTS

| | | | |
|---|---|---|---|
| 5,033,842 A | | 7/1991 | Tam |
| 5,287,131 A | * | 2/1994 | Lee ................................. 353/31 |
| 5,724,163 A | * | 3/1998 | David ............................. 359/15 |
| 6,185,045 B1 | * | 2/2001 | Hanano ......................... 359/631 |
| 6,439,724 B1 | * | 8/2002 | Jeon et al. ...................... 353/31 |
| 6,471,358 B1 | * | 10/2002 | Itoh et al. ...................... 353/98 |
| 6,520,643 B1 | * | 2/2003 | Holman et al. ................. 353/20 |
| 7,344,256 B2 | * | 3/2008 | Watanabe et al. .............. 353/97 |
| 7,517,090 B2 | * | 4/2009 | Vrachan et al. ................ 353/78 |
| 7,845,800 B2 | * | 12/2010 | Fujinawa ....................... 353/20 |
| 7,993,017 B2 | * | 8/2011 | Yamada et al. ................ 353/97 |
| 2004/0227909 A1 | * | 11/2004 | Dahlgren ....................... 353/97 |
| 2005/0219474 A1 | * | 10/2005 | Hara et al. ..................... 353/88 |
| 2006/0221258 A1 | * | 10/2006 | Lee et al. ..................... 348/744 |
| 2006/0244930 A1 | | 11/2006 | Hayashi et al. |
| 2006/0262284 A1 | | 11/2006 | Onishi et al. |
| 2006/0268243 A1 | * | 11/2006 | Woo et al. ...................... 353/97 |
| 2008/0186606 A1 | | 8/2008 | Sugano |

FOREIGN PATENT DOCUMENTS

| | | |
|---|---|---|
| JP | 2006-011065 A | 1/2006 |
| JP | 2008-032809 A | 2/2008 |

OTHER PUBLICATIONS

Partial European Search Report issued on May 28, 2010 in counterpart European Application No. 10156743.6.
European Search Report issued Oct. 15, 2010, in counterpart European Application No. 10156743.6.

* cited by examiner

*Primary Examiner* — Georgia Y Epps
*Assistant Examiner* — Sultan Chowdhury
(74) *Attorney, Agent, or Firm* — Sughrue Mion, PLLC

(57) ABSTRACT

An optical system is provided which includes an illumination system with a light source, a lens member which guides light from the light source, and a mirror member; an image unit on which an image is formed and on which light from the illumination system is incident; a projection system which magnifies and projects the image formed on the image unit; and a blocking unit which is mounted to the mirror member of the illumination system and partially blocks light from the light source that is directed to the mirror member.

13 Claims, 5 Drawing Sheets

OPTICAL SYSTEM INCLUDING A BLOCKING UNIT

CROSS-REFERENCE TO RELATED APPLICATIONS

This application claims priority from Korean Patent Application No. 10-2009-0060180, filed on Jul. 2, 2009, in the Korean Intellectual Property Office, the disclosure of which is incorporated herein by reference in its entirety.

BACKGROUND OF THE INVENTION

1. Field

Systems consistent with the exemplary embodiments relate to an optical system which is capable of preventing leakage of stray light.

2. Description of the Related Art

In general, optical systems are divided into illumination systems and projection systems. Illumination systems transfer light from light sources to image units, such as digital micromirror devices (DMD5), active-matrix organic light-emitting diodes (AMOLEDs), or thin-film transistor liquid crystal displays (TFT-LCDs), through light sources, lenses or mirrors. Projection systems project light imaged on the image units onto screens.

In such optical systems, light leakage may occur around images projected onto screens due to a difference in distance between image units and light sources and due to excessive illumination. Recently, to compensate for the light leakage, various improvements are being proposed, for example mounting a light trap for preventing stray light or excessive illumination to an image unit or projection lens.

However, when apparatuses need to be compact in order to increase the mobility and portability of optical systems, the design and arrangement of image units and projection lenses may be changed. Therefore, it is difficult to mount light traps for preventing light leakage in image units and projection lenses.

SUMMARY

Exemplary embodiments overcome the above disadvantages and other disadvantages not described above. Also, the exemplary embodiments are not required to overcome the disadvantages described above, and an exemplary embodiment of the present invention may not overcome any of the problems described above.

One or more exemplary embodiments provide an optical system having an improved structure to prevent light from leaking from a projected image.

According to an aspect of an exemplary embodiment, there is provided an optical system including an illumination system with a light source, a lens member which guides light from the light source, and a mirror member; an image unit on which an image is formed and on which light from the illumination system is incident; a projection system which magnifies and projects the image formed on the image unit; and a blocking unit which is mounted to the mirror member of the illumination system and partially blocks light from the light source that is directed to the mirror member.

In an exemplary embodiment of the present invention, the blocking unit may include a blocking plate which is mounted to the mirror member and partially blocks the light from the light source, and a transmission window which is formed through the blocking plate to have a predetermined area and through which a reflection surface of the mirror member is exposed.

The blocking plate may be black, and may have a thickness less than 0.1 mm.

The area of the transmission window may be equal to an area of the image formed on the image unit. The mirror member may be directly adjacent to the light source.

According to an aspect of another exemplary embodiment, there is provided an optical system including an illumination system with a light source and a mirror; an image unit on which an image is formed with light from the illumination system; a projection system which projects the image formed on the image unit; and a blocking unit which includes a coating on a surface of the mirror and partially blocks light from the light source that is directed to the mirror. The blocking unit may include a transmission portion through which a reflection surface of the mirror is exposed.

The light-shielding coating portion may be formed using a black pigment, and an area of the transmission portion may equal an area of the image formed on the image unit.

The mirror may be directly adjacent to the light source.

As described above, according to exemplary embodiments, a blocking unit capable of preventing stray light may be provided on a light path between a light source and an image unit, so that only an optimum amount of light required for projecting an image formed on the image unit may move through the light path. Therefore, it is possible to prevent light leakage caused by interference of the stray light.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
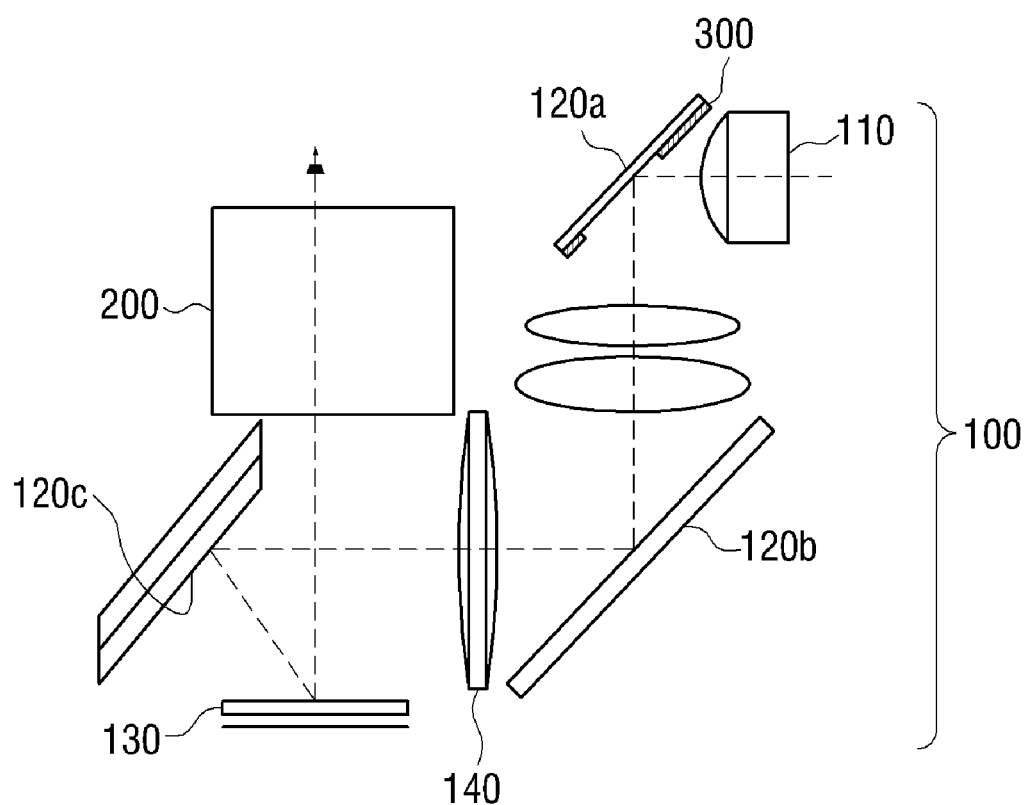
FIG. 1 is a schematic view illustrating an optical system according to an exemplary embodiment.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the invention with unnecessary detail.

Figure 2:
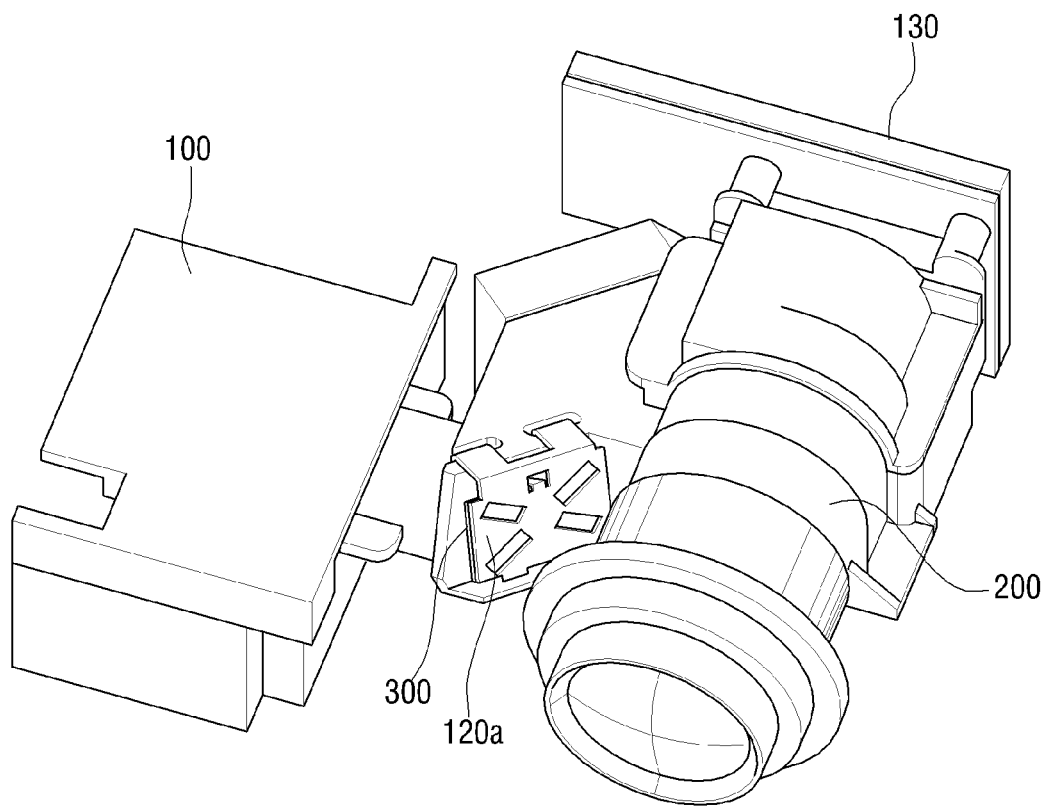
FIG. 2 is a perspective view illustrating an optical system according to an exemplary embodiment.

FIGS. 1 and 2 schematically illustrate an optical system according to an exemplary embodiment.

The optical system according to the exemplary embodiment comprises an illumination system 100, an image unit 130, a projection system 200 and a blocking unit 300.

The illumination system 100 comprises a light source 110, a first mirror member 120a, a second mirror member 120b and a third mirror member 120c, which together form a light path of light emitted from the light source 110, and a lens member 140 which is disposed between the first to third mirror members 120a to 120c, for example, between the second mirror member 120b and the third mirror member 120c.

The light source 110 may emit a single color light beam or three color light beams according to the type of image unit 130. The number of mirror members included in the illumination system 100 and the arrangement of the first to third mirror members 120a to 120c may be changed according to the configuration of the optical system. The lens member 140 uniformly guides light emitted from the light source 110.

The image unit 130 is a light receiving type display module that does not have a self light emitting function, for example, a digital micromirror device (DMD), an active-matrix organic light-emitting diode (AMOLED) or a thin-film transistor liquid crystal display (TFT-LCD). An image to be projected in response to a control signal may be formed on the image unit 130, and light emitted from the illumination system 100 may be incident on the image unit 130.

The projection system 200 is a lens member which magnifies and projects an image formed on the image unit 130. The projection system 200 receives light emitted from the light source 110 and projects the image formed on the image unit 130 onto a screen (not shown).

The blocking unit 300 may be mounted to one of the first to third mirror members 120a to 120c, and may partly block the light from the light source 110 so as to prevent the light from the light source 110 from being excessively supplied to an edge portion of the image unit 130. In other words, the blocking unit 300 may prevent light from leaking from edges of the image projected onto the screen.

Figure 3:
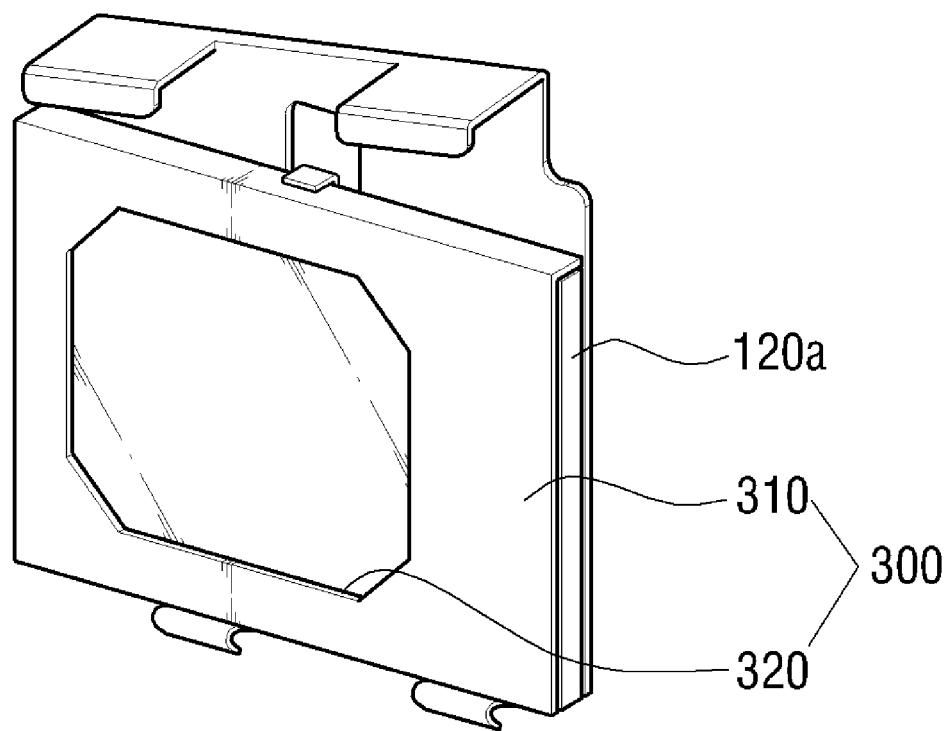
FIGS. 3 and 4 are views illustrating a blocking unit according to an exemplary embodiment.
Figure 4:
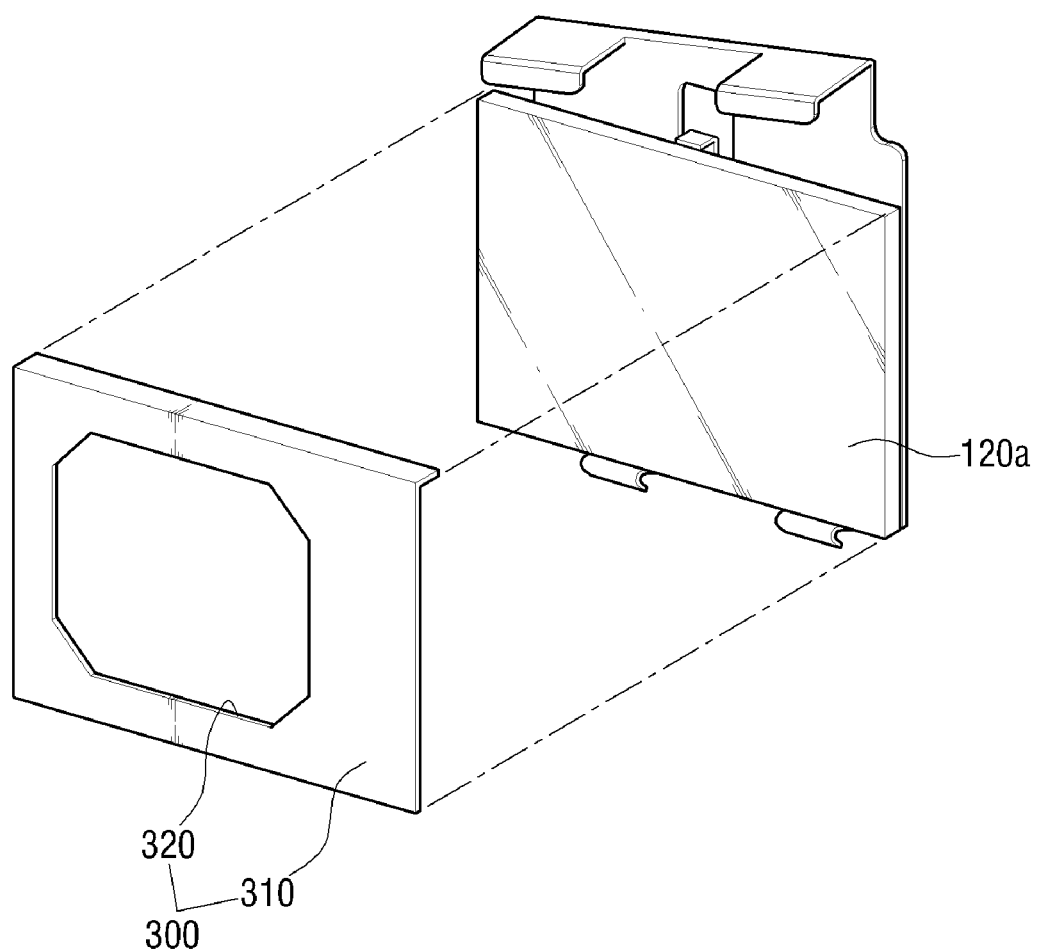

FIGS. 3 and 4 are views illustrating the blocking unit 300 according to an exemplary embodiment of the present invention.

In FIGS. 3 and 4, the blocking unit 300 comprises a blocking plate 310 and a transmission window 320.

The blocking plate 310 may be mounted to one of the first to third mirror members 120a to 120c, and may partly block the light from the light source 110 so as to prevent unnecessary light from being transferred to the edge portion of the image unit 130 along the light path.

The blocking plate 310 may be made of various materials, such as steel or resin. Additionally, the blocking plate 310 may desirably be colored with black in order to appropriately absorb or block light from the light source 110. Furthermore, the blocking plate 310 may be formed as thin as possible in order to prevent an increase in volume of an apparatus, and may desirably have a thickness of about 0.1 mm.

The transmission window 320 may desirably be formed with an area equal to an area of the image formed on the image unit 130. The area of the transmission window 320 may be changed according to the structure of the optical system. However, the light reflected from the first mirror member 120a exposed through the transmission window 320 needs to be adjusted so as not to reach the edge portion of the image unit 130.

The transmission window 320 may have a polygonal shape (for example, a rectangular shape with four chamfered corners as shown in FIGS. 3 and 4), a rectangular shape or an oval shape. The transmission window 320 may have various shapes according to the type of the image unit 130 and the structure of the optical system.

Additionally, the blocking unit 300 shown in FIGS. 3 and 4 may desirably be mounted to the first mirror member 120a closest to the light source 110, but there is no limitation thereto. Accordingly, exemplary embodiments of the present invention are also applicable to a situation in which the blocking unit 300 is mounted on other mirror members 120b and 120c according to a design of the optical system.

Figure 5:
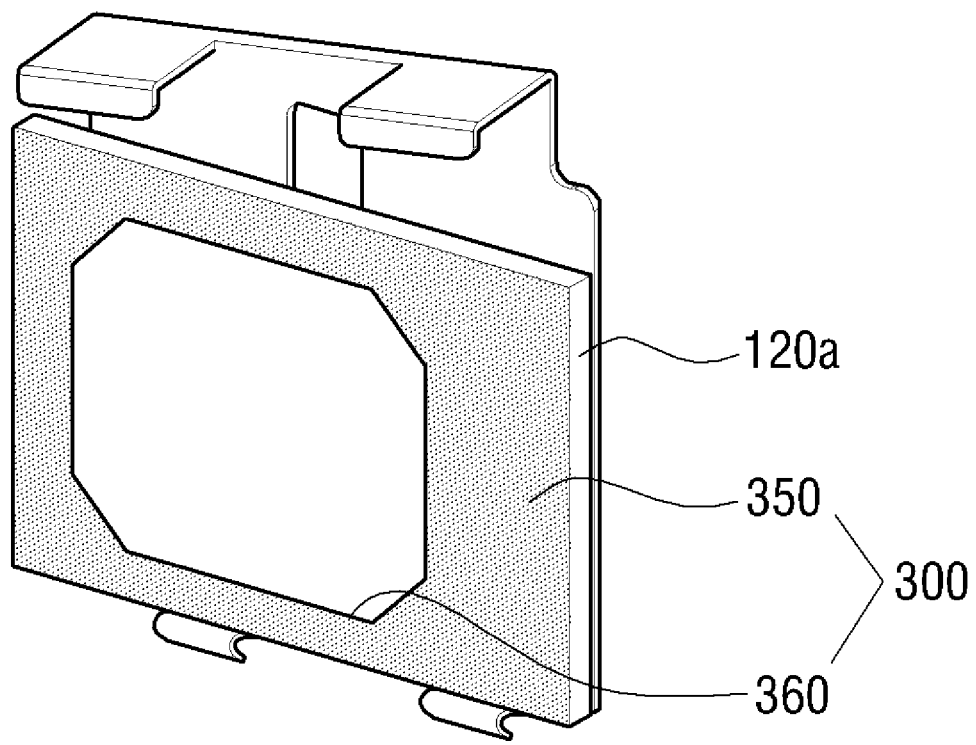
FIG. 5 is a view illustrating a blocking unit according to another exemplary embodiment.

As shown in FIG. 5, in accordance with another exemplary embodiment, the blocking unit 300 comprises a light-shielding coating portion 350 coated on a surface of the first mirror member 120a, and a transmission portion 360 through which a reflection surface of the first mirror member 120a is exposed.

To form the light-shielding coating portion 350 on the surface of the first mirror member 120a, the surface of the first mirror member 120a is coated with a light-absorbing black pigment, so that the transmission portion 360 has an area equal to the area of the image formed on the image unit 130 in the same manner as the transmission window 320 shown in FIGS. 3 and 4.

As described above, the light-shielding coating portion 350 may be formed on the surface of the first mirror member 120a, and thus it is possible to prevent excessive illumination light from being projected onto the edge portion of the image unit 130 without a need to mount and fix the blocking plate 310 as a separate member. Therefore, it is possible to prevent light leakage around edges of the image to be projected onto the screen.

In the optical system according to exemplary embodiments of the present invention as described above, unnecessary light may be blocked so as not to reach the edge portion of the image unit 130, and therefore it is possible to prevent light from leaking from the image to be projected onto the screen.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An optical system comprising:
   an illumination system comprising a light source which emits light and a mirror member which reflects the light emitted from the light source;
   an image unit on which an image is formed and on which light from the illumination system is incident;
   a projection system which magnifies and projects the image formed on the image unit; and
   a blocking unit which is mounted to the mirror member of the illumination system, wherein the blocking unit partially blocks the light emitted from the light source that is directed to the mirror member and light that is reflected from the mirror member and directed to the projection system,
   wherein the blocking unit is directly adjacent to the light source.

2. The optical system as claimed in claim 1, wherein the blocking unit comprises:
   a blocking plate which is mounted to the mirror member and partially blocks the light emitted from the light source; and
   a transmission window which is formed through the blocking plate and through which a reflection surface of the mirror member is exposed.

3. The optical system as claimed in claim 2, wherein the blocking plate is black.

4. The optical system as claimed in claim 2, wherein the blocking plate has a thickness less than 0.1 mm.

5. The optical system as claimed in claim 2, wherein the transmission window has an area which is equal to an area of the image formed on the image unit.

6. An optical system comprising:
- an illumination system comprising a light source which emits light and a mirror which reflects the light emitted by the light source;
- an image unit on which an image is formed with light from the illumination system;
- a projection system which projects the image formed on the image unit; and
- a blocking unit which is mounted to the mirror, wherein the blocking unit partially blocks light from the light source that is directed to the mirror and light that is reflected form the mirror member and directed to the projection system,
- wherein the blocking unit is directly adjacent to the light source.

7. The optical system as claimed in claim 6, wherein the blocking unit comprises:
- a blocking plate which is mounted to the mirror; and
- a transmission window which is formed within the blocking plate and through which a reflection surface of the mirror member is exposed.

8. The optical system as claimed in claim 7, wherein a thickness of the blocking plate is less than 0.1 mm.

9. The optical system as claimed in claim 7, wherein an area of the transmission window is equal to an area of the image formed on the image unit.

10. An optical system comprising:
- an illumination system comprising a light source which emits light and a mirror which reflects the light emitted by the light source;
- an image unit on which an image is formed with light from the illumination system;
- a projection system which projects the image formed on the image unit; and
- a blocking unit which comprises a coating on a surface of the mirror, wherein the blocking unit partially blocks light from the light source that is directed to the mirror and light that is reflected from the mirror member and directed to the projection system,
- wherein the blocking unit is directly adjacent to the light source.

11. The optical system as claimed in claim 10, wherein the coating comprises a black pigment.

12. The optical system as claimed in claim 10, wherein the blocking unit further comprises a transmission portion through which a reflection surface of the mirror is exposed.

13. The optical system as claimed in claim 12, wherein an area of the transmission portion is equal to a size of the image formed on the image unit.

* * * * *